J. S. McCLURG.
TIRE MOLD.
APPLICATION FILED DEC. 24, 1919.

1,437,433.

Patented Dec. 5, 1922.

WITNESSES

INVENTOR
John S. McClurg
BY
Briesen & Schrenk
ATTORNEYS

Patented Dec. 5, 1922.

1,437,433

UNITED STATES PATENT OFFICE.

JOHN S. McCLURG, OF NEW YORK, N. Y., ASSIGNOR, BY MESNE ASSIGNMENTS, TO CARLISLE TIRE CORPORATION, A CORPORATION OF DELAWARE.

TIRE MOLD.

Application filed December 24, 1919. Serial No. 347,225.

*To all whom it may concern:*

Be it known that I, JOHN S. McCLURG, a citizen of the United States, and resident of the borough of Manhattan, city, county, and State of New York, have invented certain new and useful Improvements in Tire Molds, of which the following is a specification.

My invention relates to tire molds of the type in which pneumatic tire casings are cured or vulcanized and has for its object the provision of a simple and novel construction in which the use of the customary air bag for inflating the casing in the mold is obviated. Other more specific objects of my invention will appear from the description hereinafter and the features of novelty will be pointed out in the appended claims.

Figure 2:
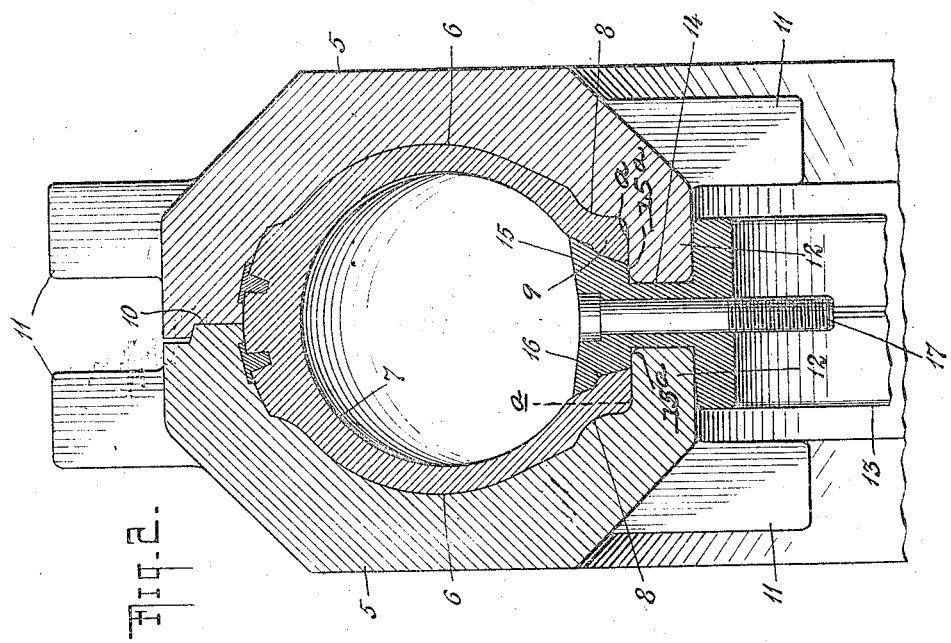
Figure 1:
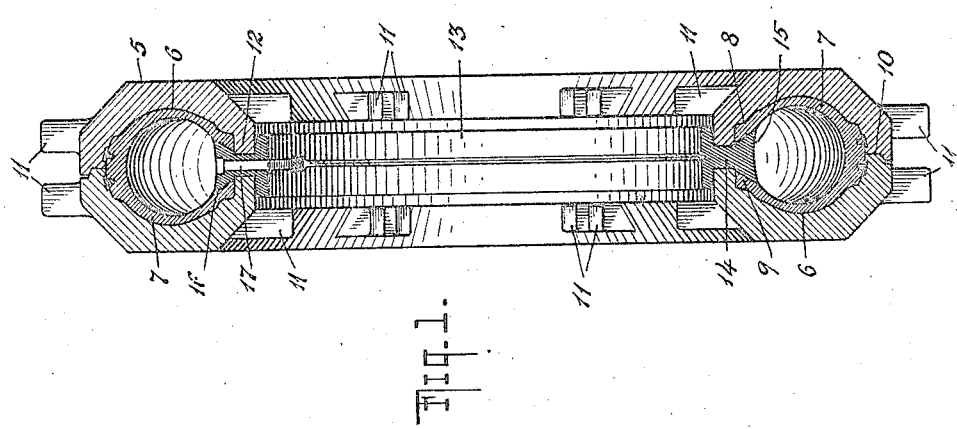

In the accompanying drawings, which illustrate an example of my invention without defining its limits, Fig. 1 is a diametrical cross section of the mold and Fig. 2 is a fragmentary cross section on an enlarged scale.

The mold may be of any conventional form and as shown comprises the sections 5 provided with complemental recesses 6 conforming throughout to all parts of the side walls and tread of the casing 7 and arranged, when operatively combined, to enclose and snugly fit the same, said recesses having continuing surfaces 8 which define the outer form of the customary beads 9. The sections 5 are arranged to fit together at 10, preferably with an overlap, so as to provide an efficient joint between said sections, and in addition are provided with the usual members 11 whereby said sections are securely fastened together in their co-operative relation. Annular flanges 12 comprising integral parts of each section 5 are located at the inner portion thereof and project toward each other as shown in the drawings. The mold further includes a metal bull-ring 13 which overlaps and lies in surface engagement with the outer surfaces of said flanges 12, said ring being formed with an annular, relatively reduced rib 14 arranged to fit between the flanges 12 as shown in the drawings. The rib 14 is continued in the form of an inner member 15 projecting laterally in opposite directions to form annular shoulders 15$^a$, which overlap and engage the flanges 12 on the inside, said member 15, in its preferred form, being further formed with annular shoulders 16 defining the inner form of the beads 9 and engaging the same, as shown in Fig. 2; when the parts are assembled the surfaces 8 and 16 are spaced apart to form annular recesses for the accommodation of said beads 9. A valve stem 17 of any suitable construction extends through a radial passage formed in the bull-ring 13, and its components, the rib 14 and inner member 15, and is secured therein in any convenient manner as by soldering; the valve stem 17 projects inwardly beyond the bull-ring 13 and is arranged for detachable connection with an air pump in the well known way.

In utilizing the mold the carcass is placed in the one section 5 and the bull-ring 13 with its component parts is properly combined with said section and then the other section is connected with the first section and with the bull-ring. After this has been done suitable pressure is applied to the mold to force the sections 5 and the bull-ring 13 into firm engagement with each other; the parts are then securely fastened together in this relation in any well known way as by bolting. By the above operations the uncured beads 9 are compressed in the annular recesses and thus act in the nature of gaskets whereby the joints or connections between the sections 5 and the bull-ring 13 are rendered air tight; the inside of the carcass plus the bull-ring thus becomes an absolutely air tight chamber. Air is then introduced through the valve stem 17 by means of a suitable air pump or the like to distend the carcass or casing 7 into firm, even engagement with the inner surface of the mold after which the latter is ready to be placed in the vulcanizer in the regular way. The air pressure within the casing, no matter how high within the limits of the device it may rise, tends to force the member 15 of the bull ring 13, that is to say, the annular shoulders 15$^a$ thereof, firmly against face $a$ of the flanges 12 of the mold and thereby prevents the possibility of any escape of air at these points; if, however, for any reason, air should work its way between the casing and the member 15, the fact that such air is under pressure, will bring about a compression of the rubber of the beads 9 and thus jam it against the annular shoulders 16 and into any exit crevice which may tend to form. Such an occurrence, which ordinarily would prove disastrous to the efficiency of the mold, in the present construction only serves to still further assure the air tightness thereof.

As the usefulness of the air-bags used in the vulcanization of tire casings is generally destroyed by the vulcanizing process, it follows that by obviating the necessity for an air bag a considerable saving of valuable material is possible wtih the present invention, thus materially reducing the cost of production of said tire casings. At the same time the absence of an air bag does away with objections resulting from its use, such as pinching of the bag and the consequent effect upon the interior surface of the casing; furthermore, by applying the air pressure directly to the casing, the latter is positively distended into proper engagement with the mold and an interior surface of maximum uniformity is produced.

Various changes in the specific form shown and described may be made within the scope of the claims without departing from the spirit of my invention.

I claim:

1. A mold for vulcanizing tire casings comprising complemental sections arranged to contain the casing, annular flanges forming part of said sections and projecting toward each other and presenting inside of the mold an annular seat for a co-operating annular member; an annular member fitted between said flanges and confining the beads of the casing under pressure whereby the interior of said casing is converted into an air-tight chamber, said member being provided with annular shoulders extending across and adapted to engage the seat on the said flanges on the inside and arranged to be forced into contact with the same by the pressure fluid within the casing and under corresponding pressure to preserve the air tightness of said chamber, and means whereby pressure fluid is introduced into the latter.

2. A mold for vulcanizing tire casing comprising complemental sections arranged to contain the casing, annular flanges forming part of said sections and projecting toward each other and presenting inside of the mold an annular seat for a co-operating annular member; an annular member fitted between said flanges and confining the beads of the said casing under pressure whereby the interior of said casing is converted into an air-tight chamber, said member being provided with annular shoulders adapted, in conjunction with said flanges, to define spaces into which said beads are forced, additional annular shoulders on said member extending across and adapted to engage the seat on the said flanges on the inside and arranged to be forced into contact with the same by the pressure fluid within the casing and under corresponding pressure to preserve the air tightness of said chamber, and a valve stem carried by said annular member whereby pressure fluid is introduced into said chamber.

In testimony whereof I have hereunto set my hand.

JOHN S. McCLURG.